(12) United States Patent
Das et al.

(10) Patent No.: US 9,433,010 B2
(45) Date of Patent: Aug. 30, 2016

(54) METHOD AND APPARATUS FOR NETWORK BASED POSITIONING (NBP)

(71) Applicant: QUALCOMM Incorporated, San Diego, CA (US)

(72) Inventors: Saumitra Mohan Das, Santa Clara, CA (US); Sai Pradeep Venkatraman, Santa Clara, CA (US); Weihua Gao, San Jose, CA (US); Vinay Sridhara, Sunnyvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 144 days.

(21) Appl. No.: 14/165,213

(22) Filed: Jan. 27, 2014

(65) Prior Publication Data

US 2015/0215955 A1   Jul. 30, 2015

(51) Int. Cl.
*H04W 72/10* (2009.01)
*H04W 48/04* (2009.01)
*H04W 64/00* (2009.01)
*G01S 5/02* (2010.01)

(52) U.S. Cl.
CPC ............ *H04W 72/10* (2013.01); *G01S 5/0263* (2013.01); *H04W 48/04* (2013.01); *H04W 64/00* (2013.01)

(58) Field of Classification Search
CPC .............................. H04W 28/26; H04W 72/10
See application file for complete search history.

(56) References Cited

U.S. PATENT DOCUMENTS

| | | | |
|---|---|---|---|
| 6,385,458 B1 | 5/2002 | Papadimitriou et al. | |
| 7,031,722 B2 | 4/2006 | Naghian et al. | |
| 7,831,264 B2 | 11/2010 | Miegel | |
| 2004/0062273 A1* | 4/2004 | Frank | G01S 5/0252 370/468 |
| 2009/0002237 A1 | 1/2009 | Nonoyama | |
| 2009/0122769 A1 | 5/2009 | Hirano et al. | |
| 2009/0262698 A1* | 10/2009 | Suga | H04W 72/10 370/329 |
| 2011/0117926 A1* | 5/2011 | Hwang | H04W 64/00 455/456.1 |
| 2013/0063489 A1* | 3/2013 | Hourie | G06F 17/30241 345/643 |
| 2015/0024753 A1* | 1/2015 | Palenius | H04W 36/0083 455/436 |

FOREIGN PATENT DOCUMENTS

| | | |
|---|---|---|
| WO | 9946949 A1 | 9/1999 |
| WO | 2007007904 A1 | 1/2007 |

OTHER PUBLICATIONS

International Search Report and Written Opinion—PCT/US2015/012810—ISA/EPO—Jun. 10, 2015.

(Continued)

*Primary Examiner* — Hassan Kizou
*Assistant Examiner* — Ashil Farahmand
(74) *Attorney, Agent, or Firm* — Muncy, Geissler, Olds & Lowe, P.C.

(57) ABSTRACT

Systems and methods of network based positioning include a server configured to assign priority levels to mobile devices locatable within the network, and allocate network resources for network based positioning of the locatable mobile devices, based on the corresponding priority levels assigned to the mobile devices. The server may further be configured to admit only a selected subset of the locatable mobile devices into the network for purposes of network based positioning and deny admission to the remaining locatable mobile devices, wherein the selected subset can be determined based on an attribute of the mobile device and/or a characteristic of the user of the mobile device.

22 Claims, 6 Drawing Sheets

(56) References Cited

OTHER PUBLICATIONS

"LTE Location Based Services Technology Introduction White paper Table of Contents OA Rohde & Schwarz LTE Location Based Services—Technology Introduction 2", Apr. 1, 2013, pp. 1-22, XP055192328, Munchen, Retrieved from the Internet: URL: http://www.rohde-schwarz.de/file/LTE_L  BS_White_Paper.pdf [retrieved on May 29, 2015].

* cited by examiner

METHOD AND APPARATUS FOR NETWORK BASED POSITIONING (NBP)

FIELD OF DISCLOSURE

Disclosed embodiments are directed to methods and apparatuses for network based positioning (NBP) of mobile devices. More particularly, some embodiments are directed to priority based allocation of network resources for tracking mobile devices locatable within the network, based on priorities assigned to the mobile devices. Some embodiments are also directed to admission control for allocation of network resources for tracking the locatable mobile devices.

BACKGROUND

Applications related to tracking, navigation, positioning, etc., of mobile devices are becoming increasingly sophisticated. Global navigation satellite systems (GNSS) such as global positioning systems (GPS) are satellite-based systems used for navigation or position determination of a mobile device, based, for example, on trilateration of wireless signals received from satellites to estimate geographic position and heading. Hybrid positioning is also possible using wireless signals from cellular networks or terrestrial sources, such as wireless wide area networks (WWAN), global system for mobile communications (GSM), code division multiple access (CDMA), long term evolution (LTE) networks, etc.

On one hand, a user of a mobile device may wish to initiate and perform tracking functions on the mobile device for popular applications which involve navigation guidance, obtaining directions to geographical locations, obtaining information about the user's surroundings, vicinity, terrain, speed of motion, heading, etc.

On the other hand, a third party may wish to track real time location and movement of a mobile device with a view to determining the user's precise location and any related movement. Several applications rely on such tracking of a user's position. These applications may relate to law enforcement and surveillance where a law enforcement agency may wish to locate an individual of interest by tracking the individual's mobile device. Private or public agencies may wish to track employees or personnel—for example, a Taxi company may track the position of Taxis within the company's employ in order to efficiently manage its fleet of Taxis; a hospital may wish to track the location of key personnel such as, doctors or nurses; a super market or grocery store may wish to track the location of customers in order to obtain information on a user's shopping patterns and provide targeted advertisements to their mobile devices; office buildings may wish to track high level executives or key employees; highly secure environments may have an interest in tracking security personnel, as well as, detect any intruders or unauthorized mobile devices in the secure environments, etc. In all these examples, the tracking or positioning may be initiated by the third party wishing to track a mobile device, as opposed to previously mentioned tracking or positioning applications initiated by the mobile device user. This latter form of tracking is generally referred to as network based tracking or network based positioning (NBP).

Typically, NBP involves provisioning of resources for each mobile device tracked. When satellite based tracking may not be feasible (e.g., when the mobile device is located in an area where satellite signal coverage is weak or non-existent, like an indoor location), the tracking may need to rely on terrestrial signals, managed, for example, by cellular networks, such as, GSM, CDMA, etc., or associated service providers/carriers. In some cases, specialized location beacons or WiFi access points may be employed, particularly within indoor locations to determine the location of mobile devices, based for example, on parameters of wireless signals transmitted to and received from the mobile devices. Such parameters may include time of arrival (TOA), time difference of arrival (TDOA), received signal strength indication (RSSI), round trip time (RTT), observed time difference (OTD) measurements, etc.

The resources required for NBP, for example, in terms of bandwidth and processing capacity, compete with other services provided by the networks, such as, voice, data, and/or multi-media communications. Further, the resources allocated for tracking one mobile device may also compete with resources allocated for tracking other mobile devices which are locatable within the network, particularly where the resources for NBP are scarce in relation to the number of locatable mobile devices. Accordingly, there is a need for intelligently managing the network resources among competing services, as well as, resource allocation within particular services such as NBP.

SUMMARY

Systems and methods of network based positioning comprising a positioning server configured to assigning priority levels to mobile devices locatable within the network, and allocate network resources for network based positioning of the locatable mobile devices, based on the corresponding priority levels assigned to the mobile devices, such that a higher quality of service (QoS) is provided to the locatable mobile devices with higher priority levels. The positioning server may further be configured to admit only a first or selected subset of the locatable mobile devices into the network for purposes of network based positioning and deny admission to a second subset or the remaining locatable mobile devices, wherein the first and/or second subsets can be determined based on an attribute of the mobile device, a characteristic of the user of the mobile device, or any combination thereof.

Accordingly, an exemplary embodiment is directed to a method of network based positioning, the method comprising assigning, by the network, priority levels to mobile devices locatable within the network, and allocating network resources for network based positioning of the locatable mobile devices, based on the corresponding priority levels assigned to the mobile devices.

Another exemplary embodiment is directed to a network comprising: means for assigning priority levels to mobile devices locatable within the network, and means for allocating resources of the network for network based positioning of the locatable mobile devices, based on the corresponding priority levels assigned to the mobile devices.

Another exemplary embodiment is directed to a network based positioning server comprising: a priority assignment module configured to assign priority levels to mobile devices locatable within a network; and a resource allocation module configured to allocate network resources for network based positioning of the locatable mobile devices, based on the corresponding priority levels assigned to the mobile devices.

Yet another exemplary embodiment is configured to a network based positioning server comprising a memory, and a processor coupled to the memory, the processor configured to assign priority levels to mobile devices locatable within a network, and allocate network resources for network based positioning of the locatable mobile devices, based on the corresponding priority levels assigned to the mobile devices. The processor may be further configured to determine a selected subset of the locatable mobile devices as admitted mobile devices and allocate the network resources for network based positioning of only the admitted mobile devices.

BRIEF DESCRIPTION OF THE DRAWINGS

The accompanying drawings are presented to aid in the description of embodiments of the invention and are provided solely for illustration of the embodiments and not limitation thereof.

DETAILED DESCRIPTION

Figure 1:
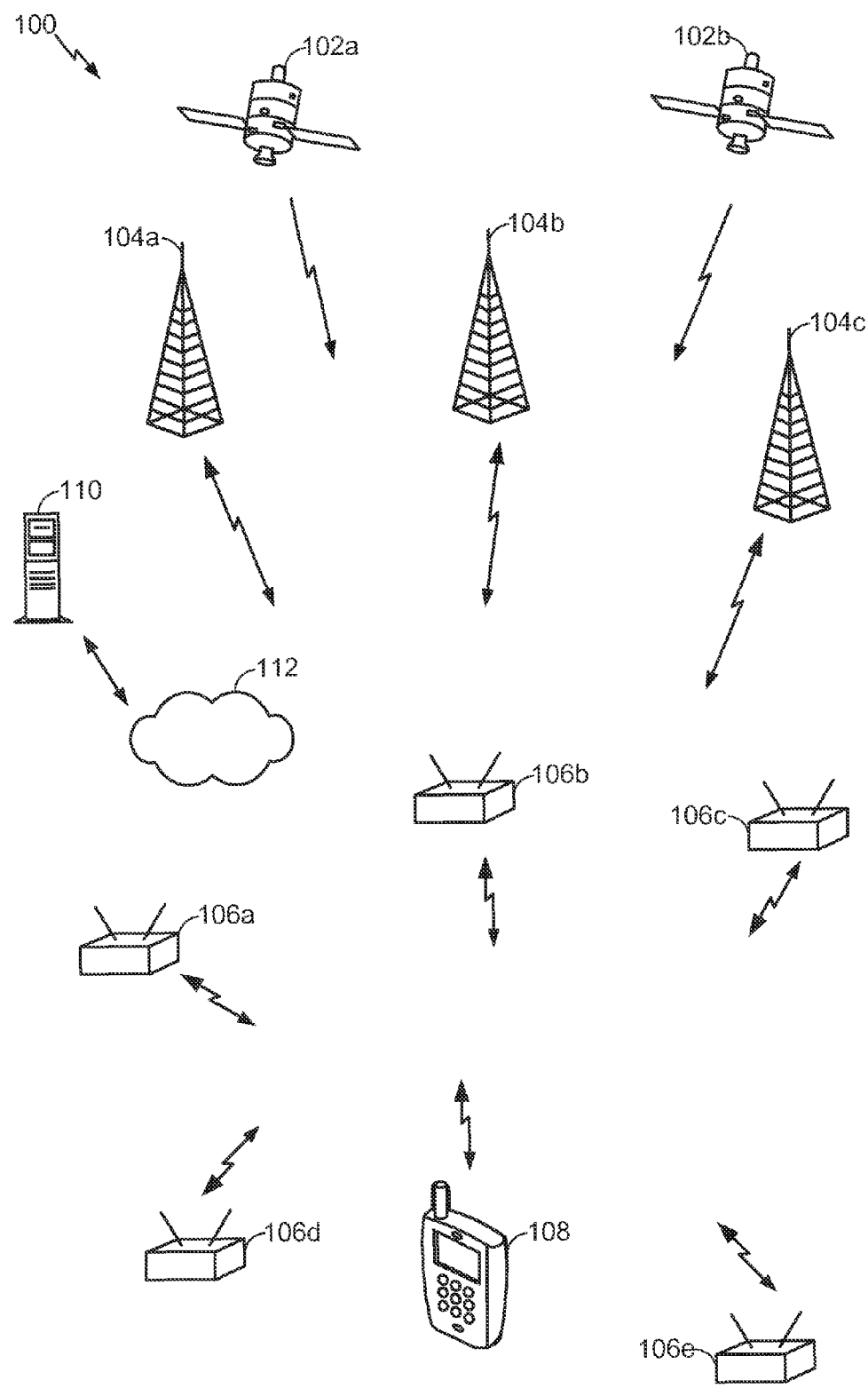
FIG. 1 illustrates an operating environment wherein aspects disclosed may be deployed.

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

The word "exemplary" is used herein to mean "serving as an example, instance, or illustration." Any embodiment described herein as "exemplary" is not necessarily to be construed as preferred or advantageous over other embodiments. Likewise, the term "embodiments of the invention" does not require that all embodiments of the invention include the discussed feature, advantage or mode of operation.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

As previously mentioned, network based positioning (NBP) of mobile devices has many popular applications. These applications can range from law enforcement, surveillance, targeted advertisements, emergency services, security concerns, etc. While in some cases the user of a mobile device may acknowledge and actively subscribe to or enroll in network based positioning or tracking where the mobile device may be configured to actively provide assistance in such tracking, in some cases, it is also possible to track a mobile device unbeknownst to the user or without user-initiated assistance from the mobile device. In either of these cases, the tracking or positioning services are performed in a centralized manner, which draws from the overall resources available to the network. As described herein, network positioning resources, or resources for NBP comprise network resources in terms of bandwidth utilization for data transfers, as well as, related computational resources expended by a NBP server, for example, which is configured to handle or oversee the NBP processes within a network. Accordingly, resource allocation for NBP services may have predefined constraints on signal spectrum utilization, bandwidth, data transfer limitations, server memory utilization, etc.

In conventional systems, network based tracking and positioning services do not discriminate among the various mobile devices being tracked within the network. Conventional systems do not effectively and flexibly partition the network's resources to allow for dynamic variations in network resource utilization based on particular tracking needs or demands of specific use cases. Such indiscriminate and inflexible tracking results in poor utilization of available resources, and often leads to low quality of service (QoS) provided to the mobile devices, and unsatisfactory user experience.

Accordingly, exemplary embodiments are directed to intelligent and efficient management of network resources when it comes to network based positioning and tracking services. In this regard, some embodiments recognize that mobile devices to be tracked can often be discriminated on several criteria, such as, whether the user of a particular mobile device locatable within a network is an important or key player in a setting, whether the user is a paying customer, whether the user is a frequent client, whether the particular mobile device belongs to a preferred brand, device type, manufacturer, service provider, etc. Priorities can be assigned to the mobile devices based on one or more such criteria. Resources for NBP can be allocated based on the assigned priorities.

To illustrate exemplary techniques in a sample use case, an environment such as a hospital or airport is considered, which may comprise a large number of users and a correspondingly large number of mobile devices carried by the users. Indiscriminately tracking all these users would be unfeasible and/or wasteful, where it may be sufficient to only track or position a selected subset of these users. Moreover, by further classifying the users being tracked into tiers or priority levels, more resources can be spent on tracking or positioning higher priority users, while fewer resources can be spent on the lower priority users. This would ensure higher QoS for the higher priority users, as would be desirable in many cases.

In the example of a hospital, the doctors and surgeons may constitute key personnel whose real-time location and movements may be of interest to the hospital's administration. Thus, these key personnel may be assigned the highest priority. Other hospital staff and nurses may be classified into lower priority levels. It is possible that tracking visitors and patients may be of no interest, and thus, mobile devices pertaining to these users may be unnecessary. Based on this priority scheme, resources of a network or system that are deployed for the hospital can be managed such that a greater allocation of resources is provided to the highest priority users, proportionally fewer resources to the lower priority resources, and no resources spent on the users who have been pre-designated as unnecessary for tracking purposes. This last class of users on whom no resources are spent, are also defined as an un-admitted class herein. More specifically, some embodiments can include a notion of admission control, wherein, only pre-selected classes of users or associated mobile devices (which may be further classified into priority classes) are deemed as admitted into the network, particularly in the context of tracking or receiving NBP services. Remaining users, whose mobile devices fail the admission criteria, are not tracked or assigned any network resources towards NBP. In some aspects, the above-described priority assignment, resource allocation, and optionally, admission control, can be implemented on a positioning server of a network.

In further aspects, the priority levels may generally be assigned, based on criteria such as, whether a particular user is a known user of the network (e.g., based on a database which stores all the employees or frequent customers of an establishment's network); whether the user has been designated as a high priority customer or personnel (e.g., based on considerations of rank, management level, importance to an organization, etc.); type, make, or manufacturer of the mobile device; enrollment in loyalty programs pertaining to the network or establishment which controls or owns the network; paid subscriptions or enrollment in high quality tracking programs, etc. The corresponding allocations of network resources (i.e., both for NBP and compute resources expended by an NBP server, as noted above) based on these priorities can include allocating proportionally higher network resources to higher priority users, wherein the network resources can include one or more of: frequency of location updates sent to a user's mobile device; number of packets used for positioning the mobile device; number of rounds of round trip time (RTT) measurements related to the tracking/positioning; complexity or choice of algorithms used for measuring received signal strength indication (RSSI)/RTT or combinations thereof related to the tracking/positioning; number of RSSI/RTT measurement retries; quality/resolution of presentation map associated with positioning the mobile device or the precision of positioning; signals or combinations of signals used for positioning, including but not limited to, satellite signals, terrestrial signals, cellular signals, WiFi, etc.

With reference now to FIG. 1, an exemplary environment, generally designated as network 100 is illustrated. Network 100 may perform network based positioning (NBP) or tracking of mobile device 108, wherein the NBP can include exemplary aspects related to assignment of priority, priority based allocation of network resources, and admission control. Some example aspects of network 100 and mobile device 108 will be described in general with respect to FIGS. 1 and 2A-B, followed by a detailed description of several aspects of exemplary NBP.

Network 100 may include one or more different types of wireless communication systems and/or wireless positioning systems. Wireless signals from satellites or GNSS sources 102a-b may be used for trilateration of mobile device 108. One or more terrestrial sources, such as cellular base stations, Wide Area Network Wireless Access Points (WAN-WAPs), wide area wireless network (WWAN), WiMAX (e.g., 802.16), etc are illustrated as sources 104a-c, which may be used for wireless voice and/or data communication, and as another source of position information for mobile device 108. Typically, WAN-WAP sources 104a-c may operate from fixed positions, and provide network coverage over large metropolitan and/or regional areas. One or more other wireless signal sources such as Local Area Network Wireless Access Points (LAN-WAPs), WLAN, Wi-Fi networks (802.11x), cellular piconets and/or femtocells, Bluetooth Networks, etc., are illustrated as sources 106a-e, which may be used for wireless voice and/or data communication, as well as yet another source for positioning data. LAN-WAP sources 106a-e may operate in indoor environments, such as buildings, and capable of performing communications over smaller geographic regions than a WWAN, for example. Positioning of mobile device 108 may be based on any one or more of sources 102a-b, 104a-c, and/or 106a-e, in any suitable combination. Furthermore, embodiments can conform to other types of positioning systems that utilize pseudolites or ground-based transceivers.

When deriving position from the WWAN, each of WAN-WAP sources 104a-c may take the form of base stations within a digital cellular network, and mobile device 108 may include a cellular transceiver and processor that can exploit the base station signals to derive position. Such cellular networks may include, but are not limited to, standards in accordance with GSM, CMDA, 2G, 3G, 4G, LTE, etc. It should be understood that digital cellular network may include additional base stations or other resources that may not be shown in FIG. 1. While WAN-WAP sources 104a-c may actually be moveable or otherwise capable of being relocated, for illustration purposes it will be assumed that they are essentially arranged in a fixed position.

Position of mobile device 108 may be determined using known time of arrival (TOA) techniques such as, for example, Advanced Forward Link Trilateration (AFLT). In some embodiments, WAN-WAP sources 104a-104c may comprise a WiMAX wireless networking base station. In some cases the assistance of positioning server 110 and communication medium 112 using TOA techniques can be employed in positioning, where positioning server 110 may communicate with mobile device 108 through communication medium 112. As such, positioning server 110 may be an NBP server, whose compute resources are allocated or apportioned according to exemplary techniques described herein. In some embodiments, positioning server 110 may be configured to assign priorities to mobile devices, allocate resources of network 100 for priority based positioning, and admission control of mobile devices for positioning. In the following sections, a further detailed exemplary implementation of positioning server 110 is provided, with reference to FIG. 2B. Communication medium 112 may include a combination of wired and wireless networks which incorporate the LAN-WAP sources 106a-e. In one embodiment, each LAN-WAP source 106a-e may be, for example, a Wi-Fi wireless access point, which is not necessarily set in a fixed position and can change location. The position of each LAN-WAP source 106a-e may be stored in the positioning server 110 in a common coordinate system. In one embodiment, the position of mobile device 108 may be determined by having mobile device 108 receive signals from each LAN-WAP source 106a-e. Each signal may be associated with its originating LAN-WAP source 106a-e based upon some form of identifying information that may be included in the received signal (such as, for example, a MAC address). Mobile device 108 may then sort the received signals based upon signal strength, and derive the time delays associated with each of the sorted received signals. Mobile device 108 may then form a message which can include the time delays and the identifying information of each of the LAN-WAP sources 106a-e, and send the message via communication medium 112 to positioning sever 110. Based upon the received message, positioning server 110 may then determine a position, using the stored locations of the relevant LAN-WAP sources 106a-e, of mobile device 108. Positioning server 110 may generate and provide a Location Configuration Indication (LCI) message to the mobile device 108 that includes a pointer to the position of mobile device 108 in a local coordinate system. The LCI message may also include other points of interest in relation to the location of mobile device 108. When computing the position of mobile device 108, positioning server 110 may take into account the different delays which can be introduced by elements within the wireless network.

The position determination techniques described herein may be used for various wireless communication networks such as a WWAN, a WLAN, a wireless personal area network (WPAN), and so on. The term "network" and "system" may be used interchangeably. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a WiMAX (IEEE 802.16) network, and so on. A CDMA network may implement one or more radio access technologies (RATs) such as cdma2000, Wideband-CDMA (W-CDMA), and so on, where cdma2000 includes IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Standards pertaining to cdma2000 are described in documents from a consortium named "3rd Generation Partnership Project 2" (3GPP2). 3GPP and 3GPP2 documents are publicly available. A WLAN may be an IEEE 802.11x network, and a WPAN may be a Bluetooth network, an IEEE 802.15x, or some other type of network. The techniques may also be used for any combination of a WWAN, WLAN and/or WPAN.

Figure 2A:
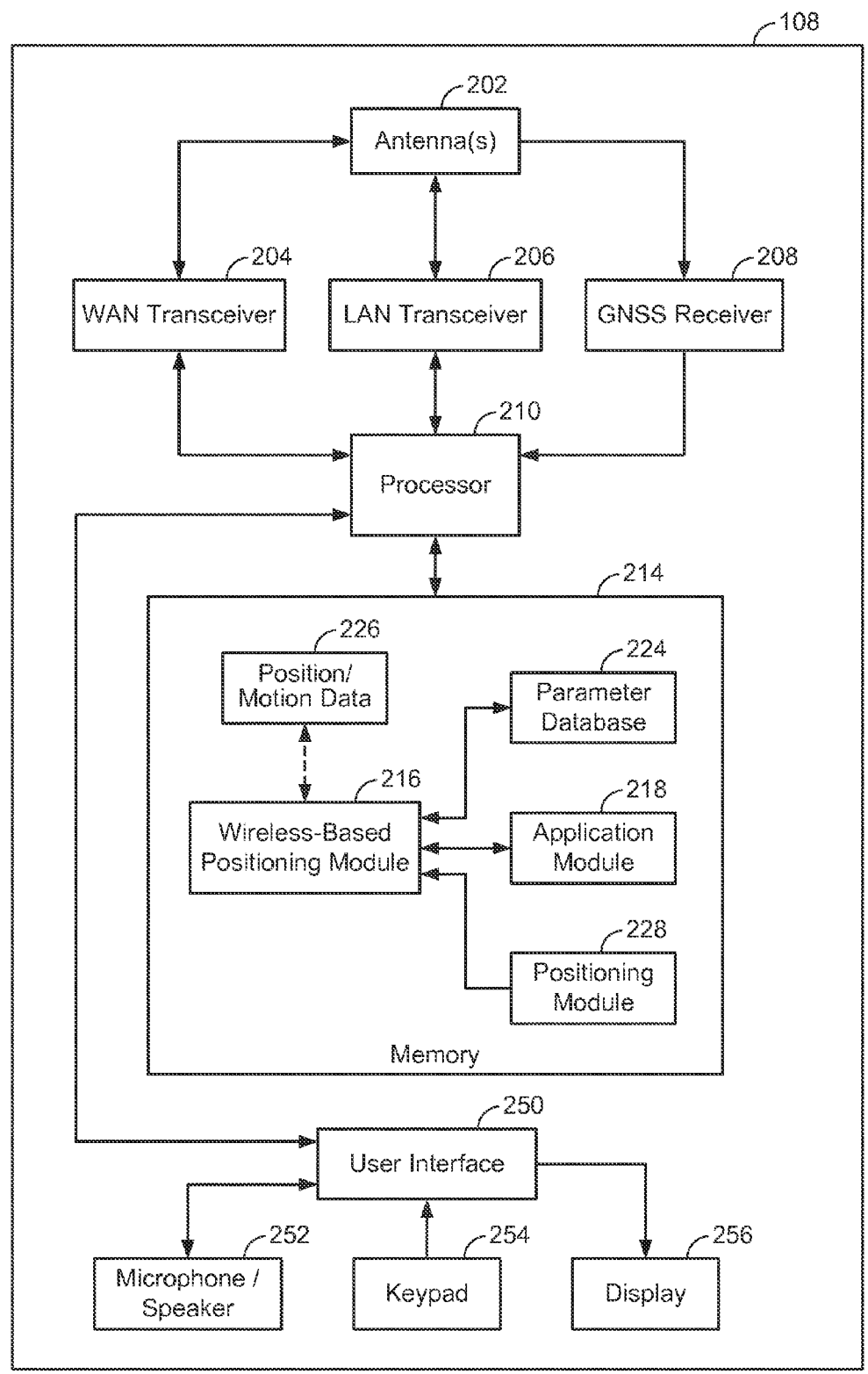
FIG. 2A illustrates a mobile device configured according to the various aspects disclosed.

With reference now to FIG. 2A, a block diagram comprising various components of exemplary mobile device 108 is illustrated. For the sake of simplicity, the various features and functions illustrated in the box diagram of FIG. 2A are connected together using a common bus which is meant to represent that these various features and functions are operatively coupled together. Those skilled in the art will recognize that other connections, mechanisms, features, functions, or the like, may be provided and adapted as necessary to operatively couple and configure an actual portable wireless device. Further, it is also recognized that one or more of the features or functions illustrated in the example of FIG. 2A may be further subdivided or two or more of the features or functions illustrated in FIG. 2A may be combined. Wide area network (WAN) transceiver 204 may be connected to one or more antennas 202 for communicating with and/or detecting signals to/from sources 104a-c. Wireless local area network (WLAN) transceiver 206 may be connected to one or more antennas 202 for communicating with and/or detecting signals to/from sources 106a-e. GNSS receiver 208 may be connected to the one or more antennas 202 for receiving satellite signals.

Processor 210 may include one or more microprocessors, microcontrollers, and/or digital signal processors that provide processing functions, as well as other calculation and control functionality. Processor 210 may be coupled to memory 214, which may include and/or otherwise receive information related to wireless-based positioning module 216, application module 218, positioning module 228, parameter database 224, and position/motion data module 226, whose functions are recognizable by one of ordinary skill in the art, and a detailed description of these will be avoided herein for the sake of brevity.

Processor 210 may include any form of logic suitable for performing at least the techniques provided herein. For example, the processor 210 may be operatively configurable based on instructions in the memory 214 to selectively initiate one or more routines pertaining to positioning of mobile device 108. Mobile device 108 may include user interface 250 which provides any suitable interface systems, such as microphone/speaker 252, keypad 254, and display 256 that allows user interaction with mobile device 108.

As used herein, the mobile device 108 may be any portable or movable device or machine that is configurable to acquire wireless signals transmitted from, and transmit wireless signals to, one or more wireless communication devices or networks. As shown in FIG. 1 and FIG. 2A, mobile device 108 is representative of such a portable wireless device. Thus, by way of example but not limitation, mobile device 108 may include a radio device, a cellular telephone device, a computing device, a personal communication system (PCS) device, or other like movable wireless communication equipped device, appliance, or machine. The term "mobile device" is also intended to include devices which communicate with a personal navigation device (PND), such as by short-range wireless, infrared, wire line connection, or other connection, regardless of whether satellite signal reception, assistance data reception, and/or position-related processing occurs at the device or at the PND. Also, "mobile device" is intended to include all devices, including wireless devices, computers, laptops, etc. which are capable of communication with a server, such as via the Internet, Wi-Fi, or other network, and regardless of whether satellite signal reception, assistance data reception, and/or position-related processing occurs at the device, at a server, or at another device associated with the network. Any operable combination of the above is also considered a "mobile device."

Figure 2B:
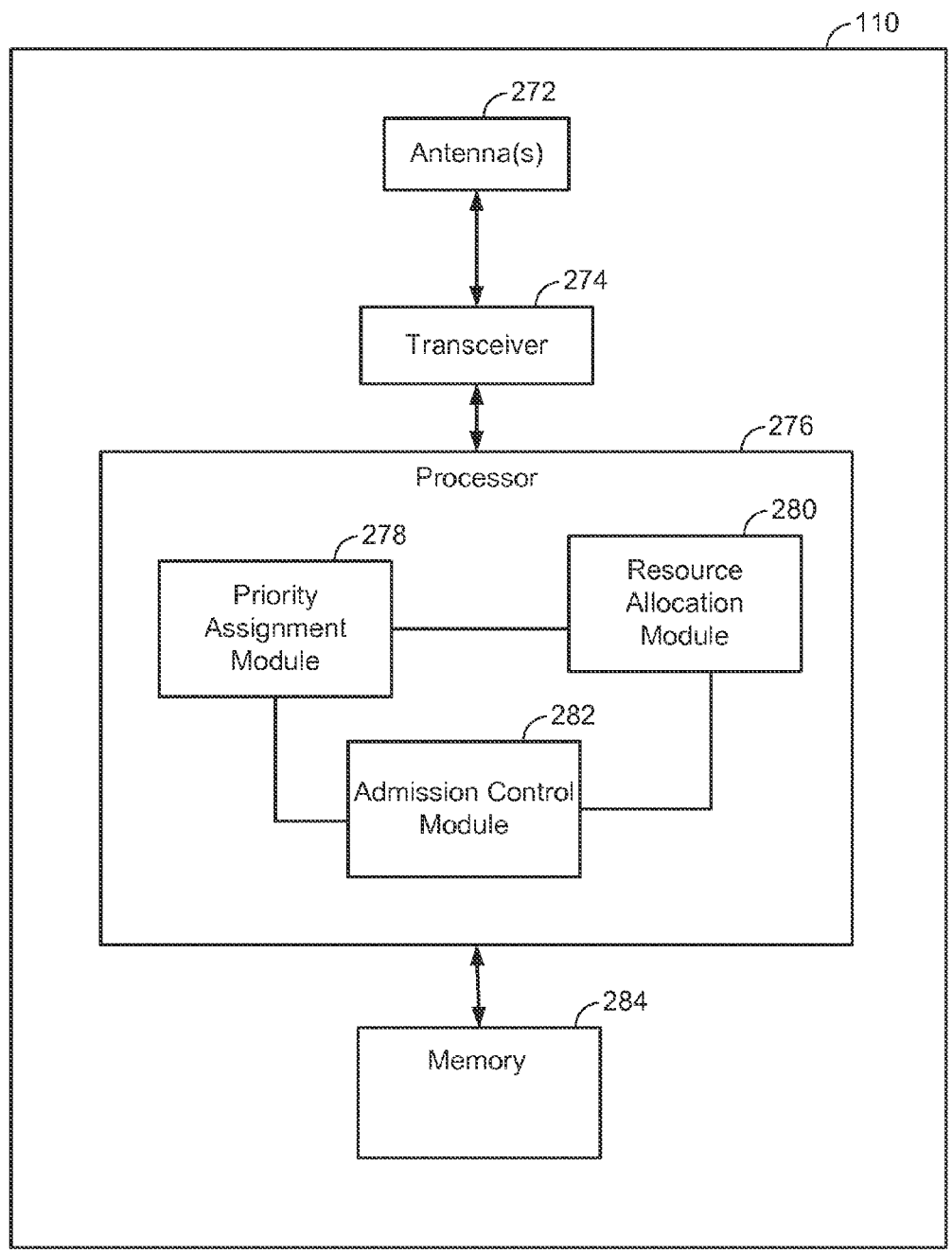
FIG. 2B illustrates a positioning server configured according to the various aspects disclosed.

With reference to FIG. 2B, a block diagram with selected components of positioning server 110 is illustrated. Positioning server 110 may be a network based positioning server according to exemplary aspects. For the sake of simplicity, a complete illustration of all standard components which may be present in positioning server 110 are avoided, and only selected components related to the various features and functions pertaining to exemplary aspects discussed herein are illustrated. Those skilled in the art will recognize the other components, connections, mechanisms, features, functions, or the like, which may be present in positioning server 110. Further, it is also recognized that one or more of the features or functions illustrated in the example of FIG. 2B may be further subdivided or two or more of the features or functions illustrated in FIG. 2B may be combined. In general, positioning server 110 may be configured to assign priorities to mobile devices, allocate resources of network 100 for priority based positioning, and for admission control of mobile devices for positioning.

Transceiver 274, which may include one or more wired or wireless receivers and transmitters, may be connected to one or more antennas 272 for communicating with and/or detecting signals to/from sources 102*a*-*b*, 104*a*-*c*, and 106*a*-*e*, as well as, with mobile device 108 through communication channel 112. Processor 276 may include one or more microprocessors, microcontrollers, and/or digital signal processors that provide processing functions, as well as other calculation and control functionality. Processor 276 may be coupled to memory 284. In some aspects, positions and other related information of sources 102*a*-*b*, 104*a*-*c*, and/or 106*a*-*e* for positioning of mobile device 108 may be stored in memory 284. As such, processor 210 may include any form of logic suitable for performing at least the techniques provided herein. For example, processor 276 may be operatively configurable based on instructions in the memory 284 to selectively initiate one or more routines pertaining to positioning of mobile device 108. In this regard, processor 276 may include modules generally depicted as priority assignment module 278, resource allocation module 280, and admission control module 282. While these modules are illustrated as disjoint modules, such illustration is only for ease of explanation, and it will be understood that the functionality of one or more of these modules can be combined and/or implemented in any suitable manner in positioning server 110.

Accordingly, priority assignment module 278 may be configured to assign priorities or priority levels to mobile devices, such as, mobile device 108 locatable within network 100, based for example, on criteria related to a user's importance or preference for positioning or criteria related to the mobile devices, as described previously. Resource allocation module 280 may be configured to allocate resources of network 100 for network based positioning of the locatable mobile devices, based on the corresponding priority levels assigned to the mobile devices by priority assignment module 278.

Admission control module 282 may be configured to implement admission control, such that, only a first or selected subset of the locatable mobile devices within network 100 are admitted into network 100 for purposes of network based positioning, and further, a second subset or the remaining locatable mobile devices are denied admission. In some cases, admission control module 282 may be configured to admit a selected subset of the locatable mobile devices, based, for example, on priority assignment provided by priority assignment module 278, where this selected subset of admitted mobile devices are allocated resources for network based positioning, for example, by resource allocation module 280. In some cases, admission control module 282 may be configured to determine the subset of admitted mobile devices in conjunction with or separately from the priorities assigned by priority assignment module 278. In some cases, admission control module 282 may be configured to determine the selected subset of admitted mobile devices based on an attribute of the mobile device, wherein the attribute comprises at least one of a device type, manufacturer, brand, registration in a loyalty program, or paid membership. Admission control module 282 may also be configured to determine the selected subset of admitted mobile devices based on a characteristic of the user of the mobile device, wherein the characteristic comprises a rank, title, job description, or status of the user. A list of the selected subset of mobile device which have been determined as admitted mobile devices, as above, may also be stored in memory 284, and retrieved by admission control module 282. Admission control module 282 may be further configured to deny admission to the second subset of the locatable mobile devices with network 100, once again, based, for example, on an attribute of the mobile device (e.g., the mobile device belongs to a disfavored device type, manufacturer, brand or lacks registration in a loyalty program or paid membership), characteristic of a user of the mobile device (e.g., lower or less preferred rank, title, job description, or status of the user for purposes of NBP, or if the user is an unauthorized user or undesired intruder located within network 100).

Resource allocation module 280 may be configured to allocate the network resources for network based positioning of a first subset comprising the admitted mobile devices and deny admission by not allocating any network resources to a second subset, which may comprise the remaining locatable mobile devices. Various other features and functions of these modules in processor 276 will be explained in the following sections.

Returning now to FIG. 1, in one exemplary embodiment, network 100 can represent any operating environment or system, pertaining, for example, to a geographical area or neighborhood (e.g., a public park or a school district), a building or establishment within geographical boundaries (e.g., an hospital, an airport, a grocery store, a shopping mall), an organization which can span several non-contiguous geographical areas (e.g., a company with several main and satellite office locations which are controlled by a central network or a centralized system for managing positioning services across all offices), a service provider (e.g., at least a subset of a cellular phone network or a Internet service provider), etc. Mobile device 108 may be one of several or many mobile devices which belong to or are locatable within network 100. As used herein, the term "locatable within" generally encompasses a device to which network 100 can provide positioning or tracking services. The term "locatable within," can include devices which are granted admission, as well as devices which are denied admission into network 100, in some cases, specifically as it pertains to positioning or tracking services of network 100. Accordingly, in some cases, network 100 may be configured to identify through known techniques (e.g., registration or attempted registration within a base station's cell or within a building's WiFi network) whether a mobile device, such as, mobile device 108 has entered network 100, and if identified as such, mobile device 108 may be termed as locatable. It must be kept in mind that not all locatable mobile devices within network 100 are tracked or provided NBP services.

Where mobile device 108 is locatable within network 100, network 100 may be configured to allocate its resources, for example, in resource allocation module 280, for positioning mobile device 108 based on one or more exemplary criteria. These criteria can include a priority level assigned to mobile device 108, for example, in priority assignment module 278, where in some aspects, the priority levels may form a basis for the type or amount of resources which will be employed by network 100 in the positioning. In some aspects, the priority levels may also used for determining admission criteria, for example, in admission control module 282, where admission of mobile device 108 to positioning services offered by network 100, for example, through positioning server 110, may be based on the assigned priority levels and/or admission criteria.

Based on the priority levels assigned by priority assignment module 278, allocation of resources in resource allocation module 280, for positioning of mobile device 108 can vary, where in one example, the variation can be in terms of which of sources 102a-b, 104a-c, and/or 106a-e, as well as, combinations thereof, should be chosen in positioning mobile device 108. For example, if mobile device 108 is of high priority, then wireless signals from several of the sources, such as, GNSS sources 102a-b, as well as, WAN-WAP sources 104a-c, and where available, LAN-WAP sources 106a-e can all be employed in combination to obtain very high quality location estimates for mobile device 108. On the other hand, if mobile device 108 is of a lower priority, then it is possible to conserve network resources by deploying fewer sources, for example, only one or more of the LAN-WAP sources 106a-e in the positioning of mobile device 108. With only LAN-WAP, such as, Wi-Fi based tracking, a much coarser position estimate of mobile device 108 is obtainable, in contrast, for example, to combining the Wi-Fi based position estimates with satellite based estimates using GNSS sources 102a-b.

In another example, resources of network 100 may be allocated, for example, in resource allocation module 280, based on frequency at which positioning calculations are updated for mobile device 108. This may mean that inter-arrival time, or time between measurements based on wireless signals, for computing the position of mobile device 108, can be varied according to priority levels provided, for example, by priority assignment module 278 to mobile device 108. A higher frequency of updates (which would mean a higher utilization of network resources such as bandwidth) can be provided for higher priority mobile devices and vice versa.

In another example, bandwidth utilization can also be customized, for example, by resource allocation module 280, based on priority levels assigned, for example, by priority assignment module 278, by altering the amount of information, such as, the previously described LCI message sent to mobile device 108 from positioning server 110. In general, LCI messages or similar digital messages can be referred to as positioning data packets, and the embodiments can be described based on number of positioning data packets used for positioning, where for a higher priority mobile device 108, a larger number of positioning data packets may be utilized.

In related cases, resource allocation module 280 may also control the number of rounds of RTT measurements utilized in computing the position of mobile device 108 based on the priority assignments by priority assignment module 278. In other examples, algorithms or complexity thereof that are selected for measuring parameters such as RSSI or RTT can be altered by resource allocation module 280 based on the assigned priority. For example, a ranging model, which is known to consume less memory or require less storage space on an NBP server (e.g., on memory 284 of positioning server 110), can be utilized for a low priority mobile device 108. Moreover, in some cases, several attempts or retries of sending and receiving signals for measurement of RSSI/RTT values may be required. For example, in some scenarios, a mobile device may be heard or detected based on RSSI but not RTT, since RTT requires a two way exchange between a signal source and a mobile device. In such cases, a retry may be required. The number of retries can be controlled by resource allocation module 280, based on the priority assigned to mobile device 108. Specifically, for a higher priority assigned to mobile device 108, the number of retries can be higher. In related aspects, hybrid RSSI and RTT measurements may be deployed for higher priority mobile devices, whereas, lower priority mobile devices may be positioned using RSSI measurements alone.

In yet another example, transmission power of signals from sources deployed by network 100, such as, sources 102a-b, 104a-c, and 106a-e, can be modified, for example, by resource allocation module 280, based on assigned priorities, for example, by priority assignment module 278. A higher transmission power consumes higher network resources, but delivers higher precision, and therefore, can be allocated to the higher priority mobile devices, while lower priority mobile devices can be tracked or positioned based on signals transmitted with lower transmission power.

In another example, the amount of ancillary data related to positioning services that is transmitted to a mobile device can be varied, for example, by resource allocation module 280, according to the assigned priority, for example, by priority assignment module 278, wherein, such ancillary data can take the form of a presentation map that is rendered on display 256 of a mobile device 108. A higher quality map, for example, of higher resolution, and/or with improved display characteristics such as, zoom functions, points of interests, etc., may be reserved for higher priority mobile devices, whereas, a lower quality map may be sufficient for lower priority devices, thus portioning resources based on assigned priorities.

As previously mentioned, several criteria may be employed by priority assignment module 278 in assigning priorities; and in some cases, the criteria may be employed by admission control module 282 in exercising admission control for mobile device 108. Broadly, the criteria may be based either on characteristics or attributes of the mobile device itself, or on the criteria may be based on the user of the mobile device.

Examples of characteristics or attributes of the mobile devices and/or the user of the mobile device, which may be employed priority assignment module 278, include, device type (e.g., whether it is a mobile phone, a laptop, a PDA, etc.), manufacturer (e.g., network 100 may be preferential to a specific manufacturer or brand), registration or enrollment of the device in a paid membership or purchased plan (e.g., if the mobile device has been enrolled in a tiered membership with fees, where the user has purchased a plan to buy into high priority assignment), frequent customer points or loyalty programs (e.g., based on recognition of mobile device 108 at a designated high frequency within network 100), etc. For admission control by admission control module 282, for example, detection of these attributes can be based, for example, on recognizing a media access control (MAC) address or internes protocol (IP address) of the mobile device and cross referencing it with databases (e.g., stored on memory 284 of positioning server 110) to see if the particular mobile device is registered in the database, and what priority level is assigned to the mobile device. In some cases, if the mobile device is not registered in the database, this may be used as admission control criteria and positioning services can be refused accordingly.

In examples where priority assignment module 278 is configured to assign priorities based on characteristics of the user of the mobile device, the characteristics can relate to whether the user is a key personnel, a rank or title of the user, the user's job description, the user's status, such as, a valued customer, frequent/loyal/known user, etc. As previously mentioned, such cases can include assigning high priorities to mobile devices of doctors or surgeons in a hospital; high priorities to elite airline club members in an airport; persons of interest in any setting pertaining to law enforcement or security, etc. By focusing resources of network 100 on the high priority tracking, the resources are efficiently utilized, and congestion caused by tracking every single locatable mobile device is avoided. In some aspects, an agent or monitor can be deployed, for example, within admission control module 282, to perform authentication or checks for user characteristics prior to expending NBP compute resources for the user. For example, the agent or monitor may be a hardware or software module which is configured to authenticate a user's loyalty points or job title, etc., before proving NBP services for the user.

While the above sample use cases have been provided for illustrative and descriptive purposes, skilled persons will recognize numerous alternative or auxiliary applications where the exemplary systems and methods for priority based NBP can be applied, without departing from the scope of this disclosure. Moreover, in some cases, the exemplary NBP techniques can be selectively deployed. For example, the priority based tracking and/or admission control may be dynamically enabled if the network's resources become scarce or congested based on other services provided by the network. Selective enabling of priority assignment module 278 and/or admission control module 282, for example, can be implemented by processor 276 based on criteria determined by or input to positioning server 110. Otherwise, the priority based NBP schemes may be disabled, and every locatable device may be tracked with equal priorities. Solutions that fall in between complete enablement and disablement, such as, partial enablement of certain criteria or combinations of criteria in assigning priorities are also possible.

As previously mentioned, FIG. 2B depicts an exemplary block diagram with selected components of positioning server 110, where, for example, processor 276 has been shown with the exemplary modules, priority assignment module 278, resource allocation module 280, and admission control module 282. Aspects of these modules have been discussed in the foregoing sections. While these modules have been shown and described as disjoint modules, in some embodiments, functionality of these can be combined and/or implemented in any suitable manner in a system such as, positioning server 110.

Figure 2C:
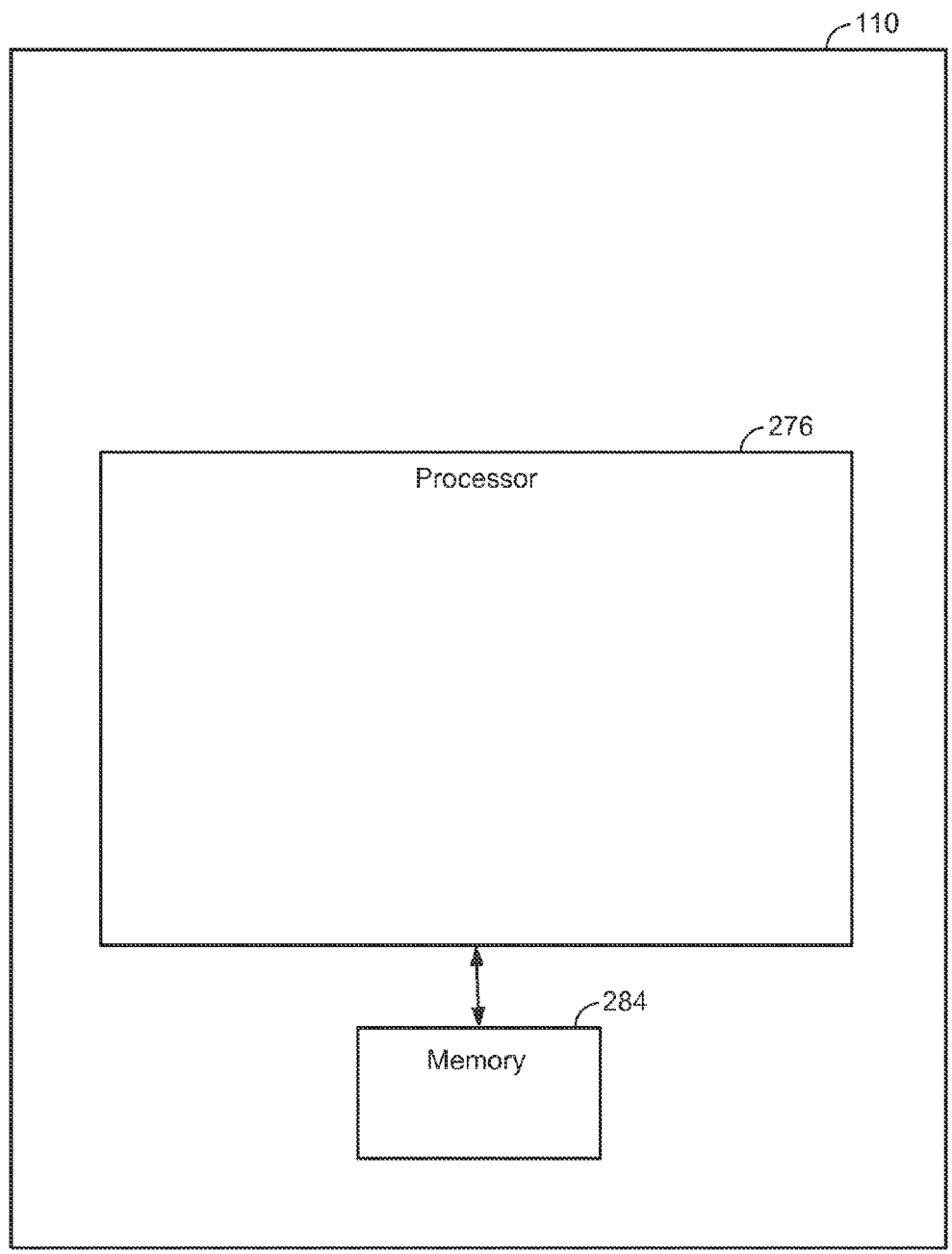
FIG. 2C illustrates another embodiment of a positioning server configured according to the various aspects disclosed.

For example, with reference to FIG. 2C, a more general depiction of a system such as positioning server 110 has been provided. Once again, FIG. 2C does not include an exhaustive illustration of all components which may be present within the system, but for the sake of simplicity, only includes features which may pertain to exemplary implementations according to this disclosure. As shown, positioning server 110 can include processor 276 coupled to memory 284. In one exemplary aspect, processor 276 can be configured to: assign priority levels to mobile devices locatable within a network, such as, network 100 and allocate network resources for network based positioning of the locatable mobile devices, based on the corresponding priority levels assigned to the mobile devices. Further, processor 276 can be configured to determine a selected subset of the locatable mobile devices as admitted mobile devices, wherein the resource allocation module is further configured to allocate the network resources for network based positioning of the admitted mobile devices. In some aspects, processor 276 may also deny admission by not allocating any network resources to another subset (e.g., a subset which does not include the selected subset) of the locatable mobile devices. Processor 276 may determine the selected subset of admitted mobile devices, and/or, the other subset of remaining mobile devices to which admission is to be denied, based on one or more attributes of the mobile devices or one or more characteristics of users of the mobile devices, as described in the previous sections.

Figure 3A:
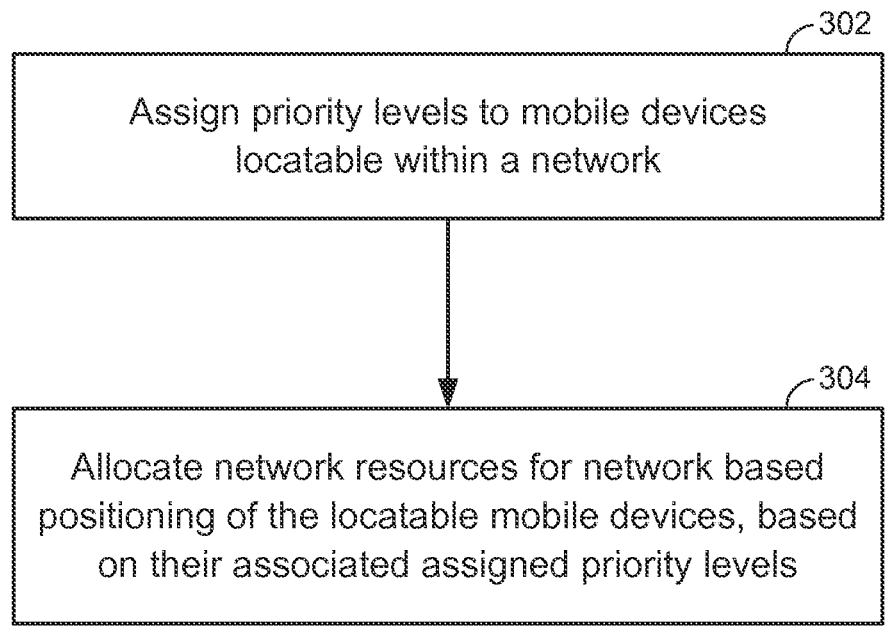
FIG. 3A illustrates a flow chart for priority based network based positioning.

It will be appreciated that embodiments include various methods for performing the processes, functions and/or algorithms disclosed herein. For example, as illustrated in FIG. 3A, an embodiment can include a method of network based positioning, the method comprising: assigning, by the network (e.g., using positioning server 110 of network 100), priority levels (e.g., in priority assignment module 278) to mobile devices (e.g., mobile device 108) locatable within the network—Block 302; and allocating network resources (e.g., by resource allocation module 280) for network based positioning of the mobile devices, based on their associated assigned priority levels—Block 304.

Figure 3B:
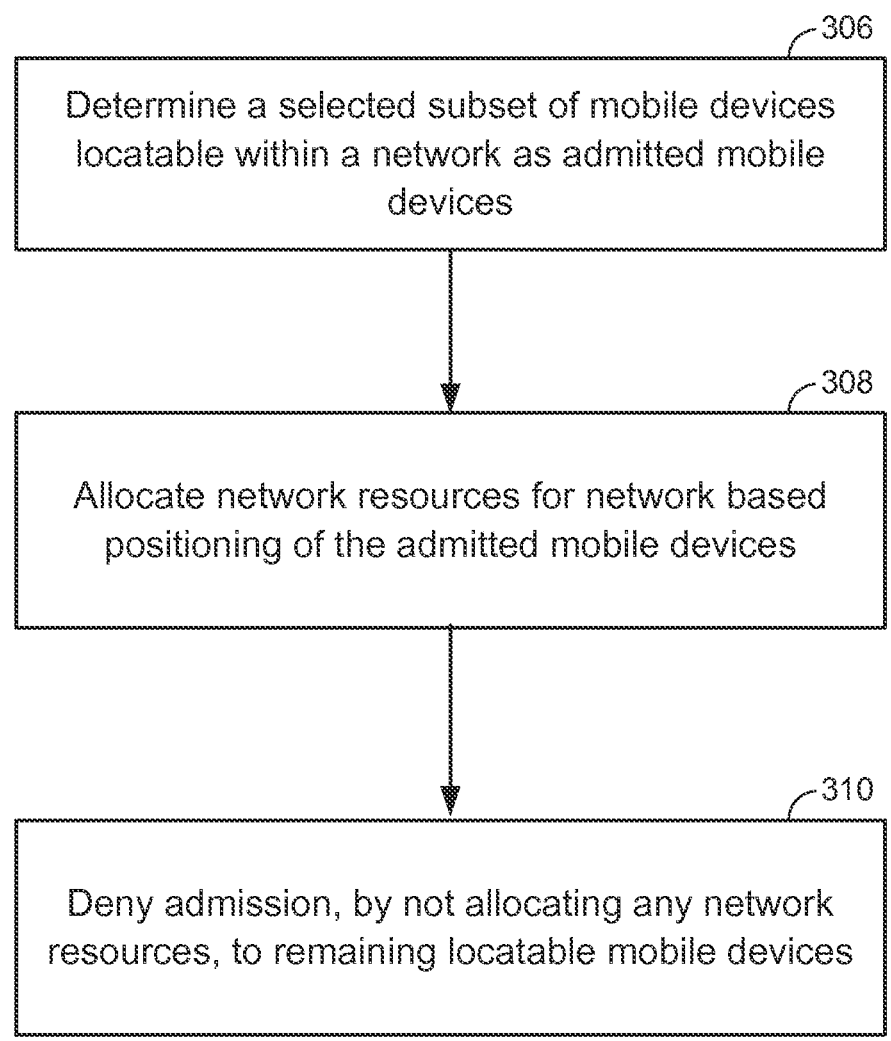
FIG. 3B illustrates a flow chart for admission control based network based positioning.

Similarly, another embodiment can include a method directed to above-described aspects of admission control. For example, as illustrated in FIG. 3B, a method can comprise determining a selected subset of mobile devices locatable within a network as admitted mobile devices (e.g., in admission control module 282)—Block 306; allocating network resources for network based positioning of the admitted mobile devices—Block 308; and denying admission, by not allocating any network resources, to remaining locatable mobile devices—Block 310. Determining the selected subset may be further based on priorities assigned to the locatable mobile devices, as described with regard to FIG. 3A. In some aspects, determining the selected subset may be based on an attribute of the mobile device, wherein the attribute comprises at least one of a device type, manufacturer, brand, registration in a loyalty program, or paid membership. Determining the selected subset may also be based on a characteristic of the user of the mobile device, wherein the characteristic comprises a rank, title, job description, or status of the user.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of aspects of this disclosure.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

Accordingly, an embodiment of the invention can include a computer readable media embodying a method for priority based network based positioning. Accordingly, the invention is not limited to illustrated examples and any means for performing the functionality described herein are included in embodiments of the invention.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A method of network based positioning, the method comprising:
   assigning, by a positioning server, a priority level for network based positioning to a mobile device locatable within the network, based on one or more attributes of the mobile device, one or more characteristics of a user of the mobile device, or any combination thereof; and
   allocating network resources for network based positioning of the mobile device, based on the priority level assigned to the mobile device, comprising providing a higher quality of service (QoS) if the mobile device is assigned a higher priority level, and wherein the QoS is based on:
   a number of positioning data packets used for network based positioning of the mobile device;
   a number of rounds of round trip time (RTT) measurements used for network based positioning of the mobile device;
   an algorithm used for measuring received signal strength indication (RSSI) and round trip time (RTT) for network based positioning of the mobile device;
   a number of received signal strength indication (RSSI) and round trip time (RTT) measurement retries for network based positioning of the mobile device; or
   any combinations thereof.

2. The method of claim 1, wherein the network resources comprise network bandwidth and computational resources pertaining to the positioning server.

3. The method of claim 1, further comprising:
   determining a first subset of one or more mobile devices locatable within the network as admitted mobile devices; and
   allocating the network resources only for the admitted mobile devices.

4. The method of claim 3, wherein determining the first subset is based on attributes of the admitted mobile devices, wherein the attributes comprise one or more of a device type, manufacturer, brand, registration in a loyalty program, paid membership, or any combination thereof.

5. The method of claim 3, wherein determining the first subset is based on characteristics of one or more users of the admitted mobile devices, wherein the characteristics comprise one or more of a rank, title, job description, status of the one or more users, or any combination thereof.

6. The method of claim 3, further comprising:
   determining a second subset of one or more mobile devices locatable within the network; and
   denying admission by not allocating any network resources to the second subset of the one or more mobile devices.

7. The method of claim 6, wherein determining the second subset is based on one or more attributes of the second subset of the one or more mobile devices, one or more characteristics of one or more users of the second subset of the one or more mobile devices, or any combination thereof.

8. The method of claim 1, wherein the one or more attributes comprise one or more of a device type, manufacturer, brand, registration in a loyalty program, paid membership, or any combination thereof, and the one or more characteristics comprise one or more of a rank, title, job description, status of the user, or any combination thereof.

9. The method of claim 1, wherein the QoS is further based on frequency of location updates sent to the mobile device.

10. The method of claim 1, wherein the QoS is further based on resolution of a presentation map used for network based positioning of the mobile device.

11. The method of claim 1, wherein the QoS is further based on signal sources used for network based positioning of the mobile device, wherein the signal sources comprise global navigation satellites and terrestrial signal sources.

12. A network comprising:
    means for assigning a priority level for network based positioning to a mobile device locatable within the network, based on one or more attributes of the mobile device, one or more characteristics of a user of the mobile device, or any combination thereof; and
    means for allocating resources of the network for network based positioning of the mobile device, based on the priority level assigned to the mobile device, comprising means for providing a higher quality of service (QoS) if the mobile device is assigned a higher priority level, and wherein the QoS is based on:
    a number of positioning data packets used for network based positioning of the mobile device:
    a number of rounds of round trip time (RTT) measurements used for network based positioning of the mobile device;
    an algorithm used for measuring received signal strength indication (RSSI) and round trip time (RTT) for network based positioning of the mobile device;
    a number of received signal strength indication (RSSI) and round trip time (RTT) measurement retries for network based positioning of the mobile device; or
    any combinations thereof.

13. The network of claim 12, further comprising:
    means for determining a selected subset of one or more mobile devices locatable within the network as admitted mobile devices, wherein the means for allocating network resources comprises means for allocating the network resources only for the admitted mobile devices.

14. The network of claim 13, wherein the selected subset is based on one or more attributes of the admitted mobile devices, wherein the one or more attributes comprise one or more of a device type, manufacturer, brand, registration in a loyalty program or paid membership, or any combination thereof.

15. The network of claim 13, wherein the selected subset is based on one or more characteristics of one or more users of the admitted mobile devices, wherein the one or more characteristics comprise a rank, title, job description, status of the one or more users, or any combination thereof.

16. The network of claim 12, wherein the QoS is further based on one or more of a frequency of location updates sent to the mobile device, resolution of a presentation map used for network based positioning of the mobile device, signal sources used for network based positioning of the mobile device, or any combination thereof.

17. A network based positioning server comprising:
   a priority assignment module configured to assign a priority level for network based positioning to a mobile device locatable within a network, based on one or more attributes of the mobile device, one or more characteristics of a user of the mobile device, or any combination thereof; and
   a resource allocation module configured to allocate network resources for network based positioning of the mobile device, based on the priority level assigned to the mobile device, wherein the resource allocation module is further configured to provide a higher quality of service (QoS) if the mobile device is assigned a higher priority level, and wherein the QoS is based on:
   a number of positioning data packets used for network based positioning of the mobile device;
   a number of rounds of round trip time (RTT) measurements used for network based positioning of the mobile device;
   an algorithm used for measuring received signal strength indication (RSSI) and round trip time (RTT) for network based positioning of the mobile device;
   a number of received signal strength indication (RSSI) and round trip time (RTT) measurement retries for network based positioning of the mobile device; or
   any combinations thereof.

18. The network based positioning server of claim 17, further comprising: an admission control module configured to determine a selected subset of one or more mobile devices locatable within the network as admitted mobile devices, wherein the resource allocation module is further configured to allocate the network resources for network based positioning of only the admitted mobile devices.

19. The network based positioning server of claim 18, wherein the selected subset is determined based on is based on one or more attributes of the admitted mobile devices, one or more characteristics of one or more users of the admitted mobile devices, or any combination thereof.

20. The network based positioning server of claim 17, wherein the QoS is further based on one or more of a frequency of location updates sent to the mobile device, resolution of a presentation map used for network based positioning of the mobile device, signal sources used for network based positioning of the mobile device, or any combination thereof.

21. A network based positioning server comprising:
   a memory;
   a processor coupled to the memory, the processor configured to:
      assign a priority level for network based positioning to a mobile device locatable within a network, based on one or more attributes of the mobile device, one or more characteristics of a user of the mobile device, or any combination thereof; and
      allocate network resources for network based positioning of the mobile device, based on the priority level assigned to the mobile device, wherein the processor is further configured to provide a higher quality of service (QoS) if the mobile device is assigned a higher priority level, and wherein the QoS is based on:
         a number of positioning data packets used for network based positioning of the mobile device;
         a number of rounds of round trip time (RTT) measurements used for network based positioning of the mobile device;
         an algorithm used for measuring received signal strength indication (RSSI) and round trip time (RTT) for network based positioning of the mobile device;
         a number of received signal strength indication (RSSI) and round trip time (RTT) measurement retries for network based positioning of the mobile device; or
         any combinations thereof.

22. The network based positioning server of claim 21, wherein the processor is further configured to determine a selected subset of one or more mobile devices locatable within the network as admitted mobile devices, and allocate the network resources for network based positioning of only the admitted mobile devices.

* * * * *